United States Patent
Karwowski et al.

(10) Patent No.: US 6,886,267 B1
(45) Date of Patent: May 3, 2005

(54) ROTOR CLEARANCE MEASUREMENT GAGE

(75) Inventors: Francis Ignatius Karwowski, Schenectady, NY (US); Peter R. Corey, Amsterdam, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/707,468

(22) Filed: Dec. 16, 2003

(51) Int. Cl.[7] .............................................. G01D 21/00
(52) U.S. Cl. .................... 33/613; 33/531; 33/501.45; 33/544.4
(58) Field of Search .............................. 33/613, 501.45, 33/501.05, 501.06, 501.08, 531, 542, 544.4

(56) References Cited

U.S. PATENT DOCUMENTS

| | | | | |
|---|---|---|---|---|
| 919,455 A | * | 4/1909 | Pietsch ......................... 33/827 |
| 2,175,650 A | * | 10/1939 | Schaber ........................ 33/836 |
| 2,197,668 A | * | 4/1940 | Starr ............................. 33/562 |
| 2,330,453 A | * | 9/1943 | Smith ........................ 33/199 R |
| 2,336,393 A | * | 12/1943 | Combes ........................ 33/836 |
| 2,579,386 A | * | 12/1951 | Koenig ......................... 33/562 |
| 2,654,957 A | * | 10/1953 | Grant ........................... 33/562 |
| 2,846,772 A | * | 8/1958 | Strausser ...................... 33/342 |
| 2,861,347 A | * | 11/1958 | Von Tarnik .............. 33/501.45 |
| 2,895,225 A | * | 7/1959 | Eisele .......................... 33/542 |
| 3,214,838 A | * | 11/1965 | Skundberg ............... 33/501.05 |
| 4,395,827 A | * | 8/1983 | Stowe et al. .................. 33/655 |
| 4,420,455 A | | 12/1983 | Qurnell et al. |
| 4,959,014 A | * | 9/1990 | Sheridan ...................... 433/72 |
| 5,363,562 A | | 11/1994 | Schmidt |
| 2004/0083618 A1 | * | 5/2004 | Kelly ........................ 33/544.4 |

\* cited by examiner

*Primary Examiner*—Diego Gutierrez
*Assistant Examiner*—Amy R. Cohen
(74) *Attorney, Agent, or Firm*—Nixon & Vanderhye P.C.

(57) ABSTRACT

A measurement gage includes a base having two scales at opposite site ends of the base for different ranges of measurement. A tapered feeler gage elements projects axially from each of the opposite ends, and a slide bar is movable along the base, with an indicator fixed thereto for each of the two different scales. Movement of the slide bar in each of two opposite axial directions is calibrated to respective thicknesses of the tapered feeler gage elements.

14 Claims, 4 Drawing Sheets

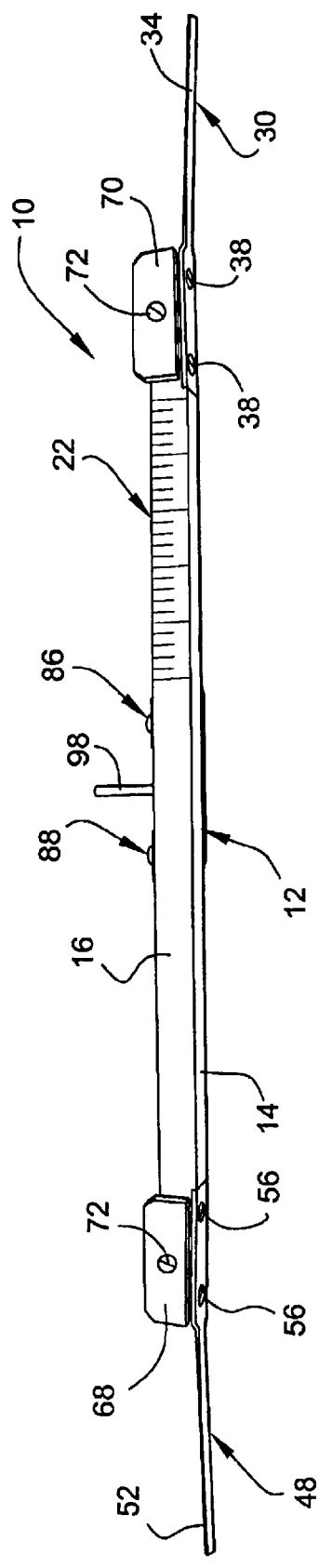
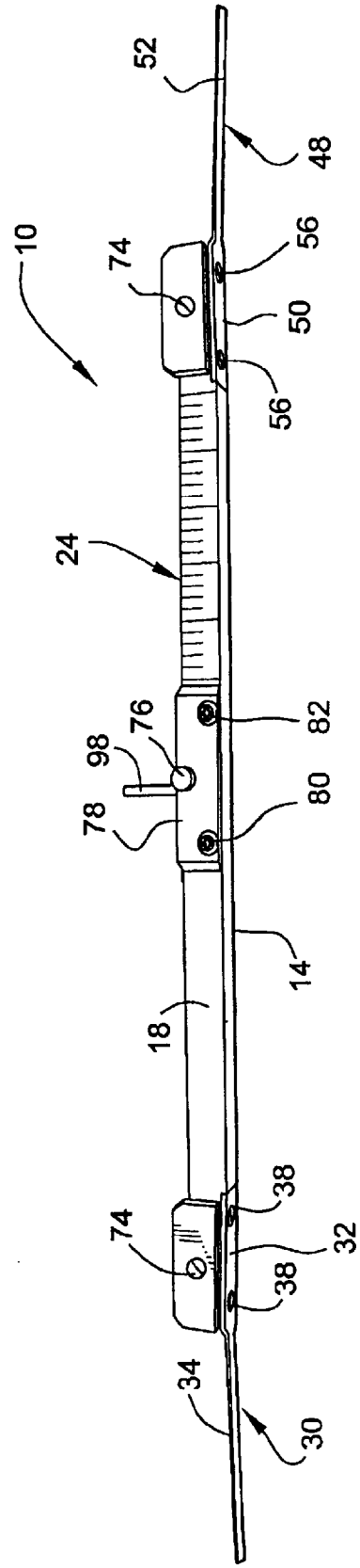

ROTOR CLEARANCE MEASUREMENT GAGE

BACKGROUND OF INVENTION

This invention relates to steam turbines used for power generation and, more specifically, to a gage used for measuring turbine rotor and packing clearances.

The interpretation of the results of performance monitoring activities can be used to identify turbine internal problems that may cause a deterioration in performance, and to assist in planning maintenance required to address the problems. However, to restore performance during a turbine maintenance outage, the turbine components contributing to the performance loss need to be identified. This can best be done by conducting a turbine steam path evaluation.

A steam path evaluation generally includes a detailed visual inspection of the steam path components and clearance measurements of the pickings and bucket tip spill strips. The visual inspection is used to evaluate and quantify the performance impact of degradation effects such as erosion, deposits, damage, preening, etc. Clearance measurements at multiple circumferential positions of the diaphragm packings, tip radial spill strips, and end shaft packings are used to quantify the effect of increased clearances. With this information, decisions can be made based on the economics associated with the repair and replacement of turbine components, and the priority of necessary repair work.

Conventional gages used to make the required clearance measurements during steam path evaluations have not been completely satisfactory. One such gage indicates measurements in 0.005 inch (5 thousandths) increments. These gradations are not sufficiently precise and oftentimes result in the operator making a guess at the measurement, or taking additional measurements with a feeler gage and then using a micrometer to determine the final measurement. In addition, the gage is not flexible and does not always fit into (or cannot reach) the areas needing measurement.

SUMMARY OF INVENTION

In one exemplary embodiment, this invention includes a measurement gage having a pair of tapered, flexible feeler gage elements extending in opposite directions from an elongated, channel-shaped base (or base-channel). One feeler gage element includes a scale in a range from 5 to 25 thousandths while the other feeler gage portion includes a scale in the range of from 25 to 50 thousandths (both in one thousandth increments), thereby increasing both the preciseness and range of the gage.

A slide bar is located in the base channel and is constrained to axial sliding movement within the channel. Measurement indicators are attached to the slide bar, one for each of the two scales on the base channel. After calibration, the indicators are pinned to insure that they do not move thereby maintaining calibration and after insertion of one of the feeler gage portions into a gap to be measured to the extent permitted by the wedge-shape of the feeler gage element, the slide bar is moved axially into engagement with a support structure directly adjacent (above or below) the gap or clearance to be measured. Movement of the slide bar and the exact location of the indicator relative to the respective scale is calibrated to the thickness of the feeler gage element such that the indicator on the slide bar will accurately show the gap or clearance measurement.

Another feature of the invention includes the ability to lock the slide bar in its, extended position with a set screw acting on a leaf spring, or to simply rely on the friction generated by the leaf spring to hold the slide bar in any position along the channel.

Another feature of the invention relates to the use for a dowel pin projecting perpendicularly away from the slide bar to facilitate movement of that bar by the user in either of two opposite directions, depending on which scale is being used.

Accordingly, in its broader aspects, the invention relates to a measurement gage comprising a base having two scales at opposite ends of the base for different ranges of measurement; a tapered feeler gage element projecting axially from each of the opposite ends; and a slide bar movable along the base and having an indicator fixed thereto for each of the two different scales; wherein movement of the slide bar in each of two opposite axial directions is calibrated to respective thicknesses of the tapered feeler gage elements.

In another aspect, the invention relates to a measurement gage comprising a base having two scales at opposite ends and on opposite sides of the base for different ranges of measurement; a tapered gage element projecting axially from each of the opposite ends; and a slide bar movable along the base and having an indicator fixed thereto for each of the two different scales; wherein movement of the slide bar in each of two opposite axial directions is calibrated to respective thicknesses of the tapered gage elements; wherein the base is channel-shaped in cross section, and the slide bar is located within the base; and further wherein one of the two different scales is adapted to measure gaps between 5 and 25 thousandths and the other of the two different scales is adapted to measure gaps between 25 and 50 thousandths.

The invention will now be described in detail in connection with the drawings identified below.

BRIEF DESCRIPTION OF DRAWINGS

FIG. 1 is a slightly tilted side elevation of the gage in accordance with an exemplary embodiment of the invention;

FIG. 2 is similar to FIG. 1 but taken from the opposite side of the gage;

DETAILED DESCRIPTION

Figure 3:
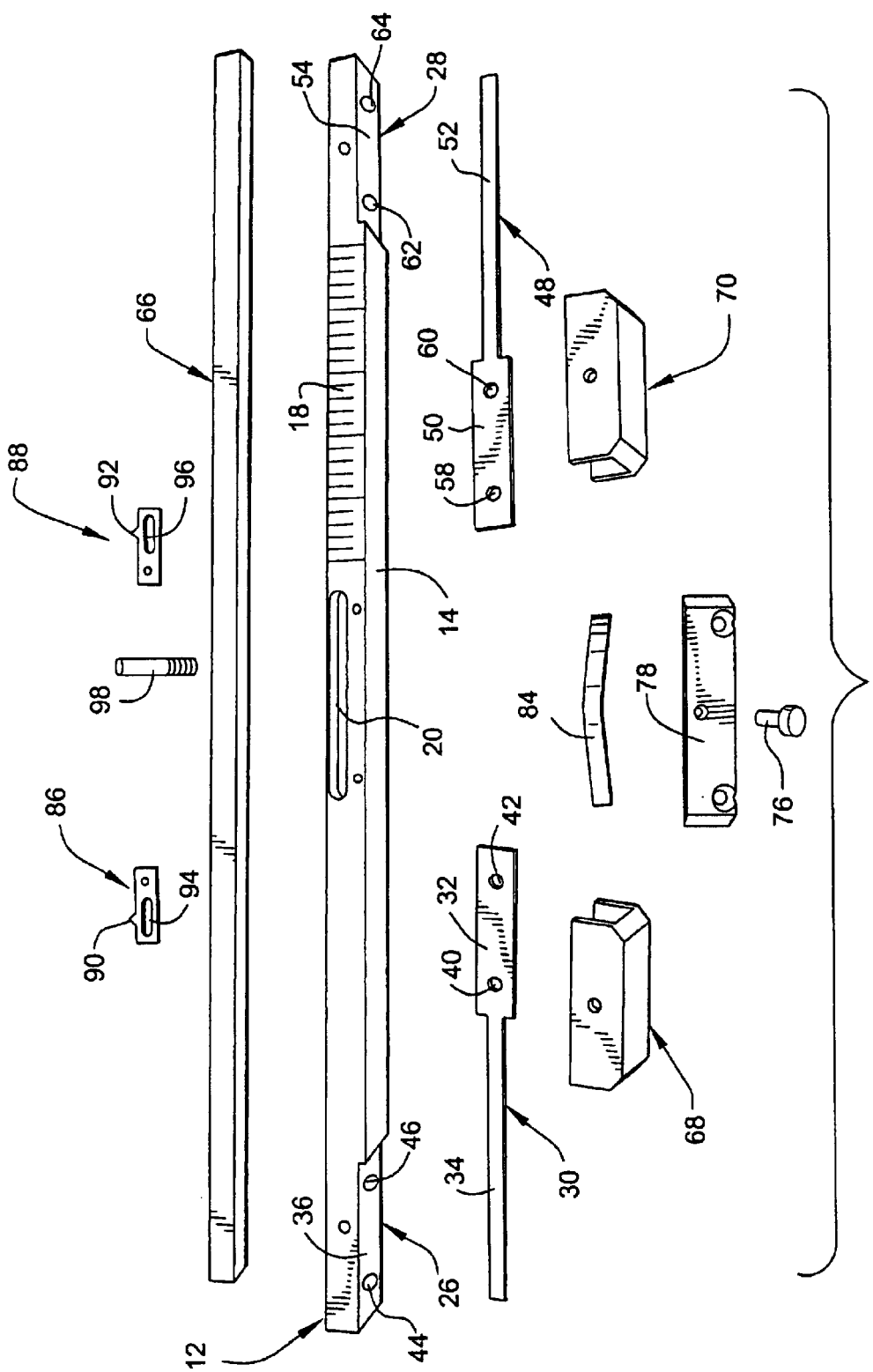
FIG. 3 is an exploded assembly drawing of the gage shown in FIGS. 1 and 2.

Referring to FIGS. 1–3, the clearance measurement gage 10 includes an elongated channel-shaped base 12 (or base channel) formed by a bottom wall 14 and a pair of perpendicular side walls 16, 18 that create a U-shaped cross-section. Side wall 18 is formed with an elongated, horizontally aligned slot 20, located centrally along the length dimension of the base 12. The function of slot 20 will be described in detail further below. Side wall 16 is provided with gradations for one scale 22 at one end of the gage corresponding to one range of rotor and packing clearances. Similarly, side wall 18 is provided at an opposite end of the gage with gradations for another scale 24 corresponding to a smaller range of rotor and packing clearances. This arrangement is for convenience and it will be understood that both scales could be located at opposite ends of one side of the base channel if desired, but this could cause some confusion reading the correct scale.

Note that the thickness of the bottom wall is reduced at opposite, exterior end portions 26, 28 (FIG. 3). A first spring tempered, tapered feeler gage element 30 is formed with a flat mounting portion 32 and a flexible tapered gage portion 34. The flat mounting portion 32 of the gage element 30 is fixed to a flat surface 36 on end portion 26 of the base 12 via screws 38 that are passed through holes 40, 42 in the mounting portion 32 and threaded in aligned correspondingly threaded holes 44, 46 in the base channel 12. A second tapered feeler gage element 48 also has a flat mounting portion 50 and a flexible tapered gage portion 52. The flat mounting portion 50 of the gage element 48 is fixed to a flat surface 54 of the end portion 28 by screws 56 that are passed through holes 58, 60 in the mounting portion 50 and threaded in aligned correspondingly threaded holes 62, 64 in the base channel 12.

A slide bar 66 (FIG. 3) is received within the base channel 12 and is slidable on the bottom wall 14 in either of two opposite axial directions. U-shaped retainer clips 68, 70 are applied over the slide bar 66 and side walls 16, 18 and are secured to the base 12 by screws 72, 74. These retainer clips confine the slide bar 66 to the base channel 12 so that only axial sliding movement of the slide bar is permitted. A threaded set screw 76 extends through a plate 78 fastened to the side wall 18 of the base channel 12 by screws 80, 82.

A leaf spring 84 is located in the slot 20, between the base side wall 18 and the slide bar 66, generating sufficient friction to prevent free sliding of the slide bar in the channel. Nevertheless, a set screw 76 extends into the slot 20 and may be tightened against the spring 84 to effectively lock the slide bar 66 in place once a measurement is determined. This allows the user to remove the gage 10 and to read the results without accidental shifting of the slide bar 66 as will be explained in greater detail below. Thus, the user may rely on friction created by spring 84, or the set screw 76 to generate additional tension so as to hold the slide bar 66 relative to the base channel 12.

As already noted, the base channel 12 is provided with two sets of gradations, or scales, one at each end of the base. The scale 22 at one end permits measurements in the range of 5 to 25 thousandths, while the scale 24 at the other end, and on the opposite side of the base, permits measurements in the range of 25 to 50 thousandths. Measurement reading indicators 86, 88 are secured on top of the slide bar 64 by screw fasteners or the like, one for each of the scales 82, 84. The indicator "points" 90, 92 face the respective scales 22, 24 on opposite side walls. Slots 94, 96 permit adjustment for purposes of calibrating the gage. In this regard, it will be appreciated that the degree of taper of the feeler gage elements 34, 52 is calibrated to the scales and to the movement of the slide bar 66 into engagement with a reference surface directly above the gap to be measured. In other words, since the measurement is determined by the extent of axial movement of the tapered feeler gage elements (e.g., element 34) into a particular gap, and since the scale 22 moves with the feeler gage element, the gap measurement can be read by the user when the slide bar 66 and indicator point 92 are moved along the scale until the slide bar 66 abuts a surface directly above or below the gap to be measured. A dowel pin 98 pressed into and projecting from the slide bar 66 facilitates movement of the slide bar 66 by the user relative to the channel base 12.

Figure 4:
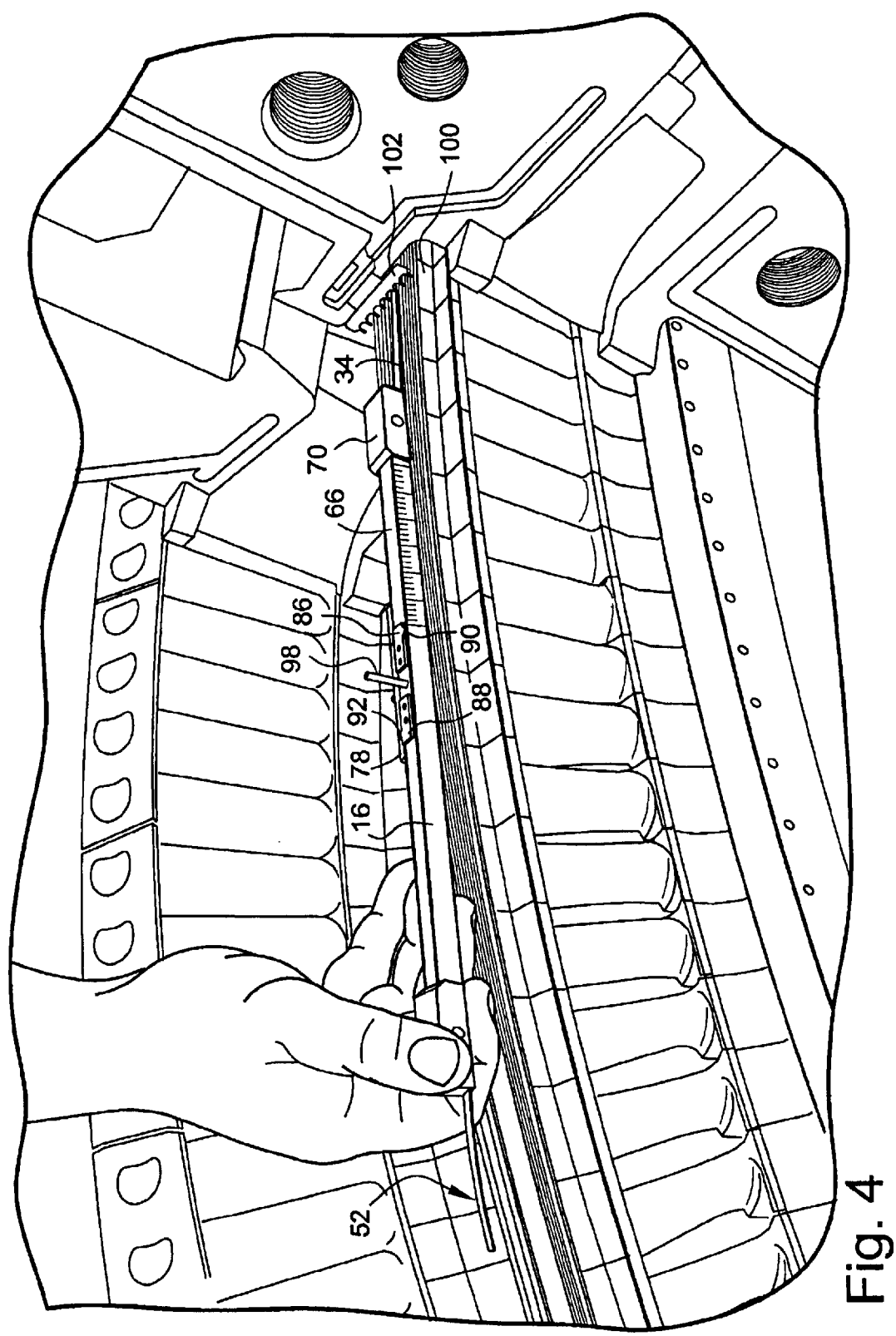
FIG. 4 is a perspective view of the gage being used to measure a turbine rotor clearance between bucket tips and packing seals, but with the slide bar not yet engaged.
Figure 5:
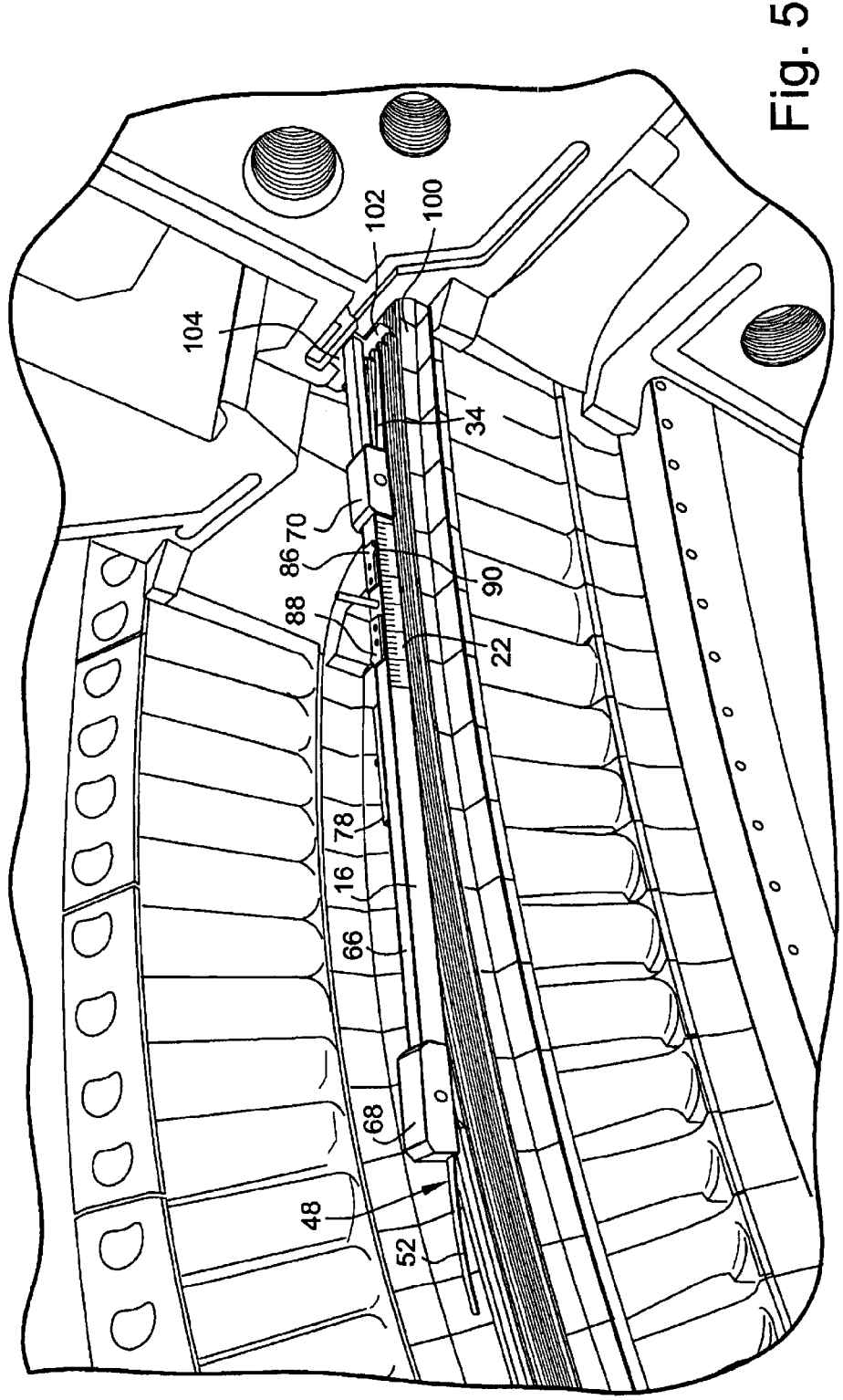
FIG. 5 is a perspective view of the gage similar to FIG. 4 but with the slide bar extended into engagement with the seal.

In use, and with reference to FIGS. 4 and 5, one of the feeler gage portions, e.g., portion 52 of element 48, is moved into a gap between the bucket spill strips 100 and seal insert 102. When the tapered, flexible feeler gage portion 52 reaches its maximum travel, i.e., where the tapered surface of feeler gage portion 52 is engaged on both sides of the gap, the slide bar 66 is moved axially along the channel until the forward edge of the bar 66 engages the support structure 104 immediately above the clearance being measured. The indicator point 90 on indicator 86 will thus identify the clearance or gap dimension. The user may then either lock the slide bar 66 in place via set screw 76, or simply rely on the friction generated by spring 84 to hold the bar 66 in place.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A measurement gage comprising a base having two scales at opposite ends of said base for different ranges of measurement;
    a tapered feeler gage element projecting axially from each of said opposite ends; and
    a slide bar movable along and relative to said base and having an indicator fixed thereto for each of said two different scales; wherein movement of said slide bar in each of two opposite axial directions relative to said base is calibrated to respective thicknesses of said tapered feeler gage elements wherein said base is channel-shaped in cross section, and said slide bar is located within said base.

2. The gage of claim 1 and comprising retainer clips at opposite ends of said base for constraining said slide bar to axial movement within said base.

3. The gage of claim 1 wherein one of said two different scales is adapted to measure gaps between 5 and 25 thousandths.

4. The gage of claim 3 wherein the other of said two different scale is adapted to measure gaps between 25 and 50 thousandths.

5. The gage of claim 1 wherein said indicator includes an indicator point and a slot adapted to receive a screw fastener, said slot permitting calibration of said indicator relative to a respective scale.

6. The gage of claim 5 wherein one of said two different scales is adapted to measure gaps between 5 and 25 microns.

7. The gage of claim 6 wherein the other of said two different scale is adapted to measure gaps between 25 and 50 microns.

8. The gage of claim 1 wherein said base includes a bottom wall and a pair of spaced side walls extending perpendicularly away from said bottom wall; at least one of said side walls having an elongated slot supporting an elongated leaf spring, and a set screw threaded into said one of side walls and engageable with said leaf spring.

9. The gage of claim 8 and comprising retainer clips at opposite ends of said base for constraining said slide bar to axial movement within said base.

10. The gage of claim 1 and further comprising a leaf spring located between said base and said slide bar for creating friction therebetween.

11. A measurement gage comprising a base having two scales at opposite ends and on opposite sides of said base for different ranges of measurement;
    a tapered gage element projecting axially from each of said opposite ends; and a slide bar movable along and relative to said base and having an indicator fixed thereto for each of said two different scales; wherein movement of said slide bar in each of two opposite axial directions relative to said base is calibrated to respective thicknesses of said tapered gage elements;

wherein said base is channel-shaped in cross section, and said slide bar is located within said base;

and further wherein one of said two different scales is adapted to measure gaps between 5 and 25 thousandths and the other of said two different scales is adapted to measure gaps between 25 and 50 thousandths.

12. The gage of claim 11 wherein said tapered gage element includes flexible feeler gage portions.

13. The gage of claim 12 wherein said indicator includes an indicator point and a slot adapted to receive a screw fastener, said slot permitting calibration of said indicator relative to a respective scale.

14. The gage of claim 11 and including a pin projecting perpendicularly bar to facilitate movement of said slide bar within said base.

* * * * *

UNITED STATES PATENT AND TRADEMARK OFFICE
CERTIFICATE OF CORRECTION

PATENT NO. : 6,886,267 B1
DATED : May 3, 2005
INVENTOR(S) : Karwowski et al.

It is certified that error appears in the above-identified patent and that said Letters Patent is hereby corrected as shown below:

<u>Title page,</u>
Item [57], ABSTRACT,
Line 2, after the word "opposite" delete the word "site".
Line 3, change the word "elements" to the word -- element --.

<u>Column 1,</u>
Line 19, change the word "pickings" to read -- packings --.
Line 22, change the word "preening" to read -- peenings --.

Signed and Sealed this

Thirteenth Day of September, 2005

JON W. DUDAS
*Director of the United States Patent and Trademark Office*